US009964125B2

(12) United States Patent
Goldfarb et al.

(10) Patent No.: US 9,964,125 B2
(45) Date of Patent: May 8, 2018

(54) DIRECTIONAL CONTROL VALVE WITH DOUBLE-SOLENOID CONFIGURATIONS

(71) Applicant: VANDERBILT UNIVERSITY, Nashville, TN (US)

(72) Inventors: Michael Goldfarb, Nashville, TN (US); Don Truex, Nashville, TN (US)

(73) Assignee: VANDERBILT UNIVERSITY, Nashville, TN (US)

( * ) Notice: Subject to any disclaimer, the term of this patent is extended or adjusted under 35 U.S.C. 154(b) by 89 days.

(21) Appl. No.: 14/758,311

(22) PCT Filed: Dec. 31, 2013

(86) PCT No.: PCT/US2013/078433
§ 371 (c)(1),
(2) Date: Jun. 29, 2015

(87) PCT Pub. No.: WO2014/106230
PCT Pub. Date: Jul. 3, 2014

(65) Prior Publication Data
US 2015/0354720 A1   Dec. 10, 2015

Related U.S. Application Data

(60) Provisional application No. 61/747,619, filed on Dec. 31, 2012.

(51) Int. Cl.
*F15B 13/04* (2006.01)
*F15B 13/043* (2006.01)
(Continued)

(52) U.S. Cl.
CPC ........ *F15B 13/0431* (2013.01); *F15B 13/044* (2013.01); *F15B 21/003* (2013.01);
(Continued)

(58) Field of Classification Search
CPC .............. F15B 13/0402; F15B 13/0431; F15B 13/044; F15B 2013/0412; F15B 21/003;
(Continued)

(56) References Cited

U.S. PATENT DOCUMENTS 2,255,617 A  *  9/1941  Hoak .................... C21D 9/663
                                                    266/252
2,843,093 A     7/1958  Vltavsky et al.
(Continued)

FOREIGN PATENT DOCUMENTS

DE       102 47 967       2/2004
GB       784 097          10/1957
(Continued)

OTHER PUBLICATIONS

Giesen, "[Energy-Savings Pneumatics: opportunities in control technology for reducing the consumption in linear drives]", *Fluid*, Jun. 1982, pp. 36-39. German.
(Continued)

*Primary Examiner* — William McCalister
(74) *Attorney, Agent, or Firm* — Parker Highlander PLLC

(57) ABSTRACT

A double-solenoid directional control valve comprising a valve body and a valve spool within the valve body, where the valve spool is configured to move within the valve body between a first position, a second position and a third position, where the third spool position lies between the first and second spool positions. In certain embodiments, the spool is maintained in the first and third positions by energizing at least a first or a second solenoid actuator, and where the spool is maintained in the second position by de-energizing both solenoid actuators.

13 Claims, 11 Drawing Sheets

(51) Int. Cl.
*F16K 11/07* (2006.01)
*F15B 13/044* (2006.01)
*F15B 21/00* (2006.01)
*F16K 31/06* (2006.01)

(52) U.S. Cl.
CPC ...... *F16K 11/0704* (2013.01); *F16K 31/0613* (2013.01); *F16K 31/0679* (2013.01); *F15B 13/0402* (2013.01); *F15B 2013/0412* (2013.01); *Y10T 137/86879* (2015.04)

(58) Field of Classification Search
CPC ............. F16K 11/0704; F16K 31/0613; F16K 31/0679; Y10T 137/86879–137/86895; Y10T 137/86574–137/86614; Y10T 137/86107; Y10T 137/87193–137/87209; Y10T 137/87249; Y10T 137/87571
USPC ... 137/625.48–625.5, 625.6–625.64, 565.26, 137/596.14–596.16, 597, 602
See application file for complete search history.

(56) References Cited

U.S. PATENT DOCUMENTS

| | | | | |
|---|---|---|---|---|
| 2,940,475 A | * | 6/1960 | Hicks | F15B 13/043 137/596.16 |
| 4,319,609 A | | 3/1982 | Debrus | |
| 5,623,968 A | * | 4/1997 | Thorp | F15B 13/0402 137/625.64 |
| 6,021,876 A | * | 2/2000 | Bowden | B60K 25/00 137/625.61 |
| 6,065,496 A | * | 5/2000 | Sanzenbacher | F15B 13/0402 137/625.65 |
| 6,192,937 B1 | * | 2/2001 | Fagerlie | F15B 13/0402 137/625.63 |
| 2011/0220822 A1 | * | 9/2011 | Bento | F15B 20/001 251/129.15 |
| 2012/0255617 A1 | | 10/2012 | Miyazoe et al. | |

FOREIGN PATENT DOCUMENTS

| | | |
|---|---|---|
| JP | A S55-135271 | 10/1980 |
| JP | A 2001-351814 | 12/2001 |

OTHER PUBLICATIONS

Giesen, "[Energy-Savings Pneumatics: opportunities in control technology for reducing the consumption in linear drives]", *Fluid*, Jun. 1982. English Translation.
International Preliminary Report on Patentability issued in International Application No. PCT/US2013/078433, dated Jul. 9, 2015.
International Search Report and Written Opinion issued in International Application No. PCT/US2013/078433, dated Apr. 23, 2014.
Office Communication Issued in Japanese Application No. 2015-550858, dated Oct. 30, 2017. (English Translation).

* cited by examiner

| Position | Spool/body illustration | Port connectivity | Solenoid state |
|---|---|---|---|
| P1 |  | A↔E<br>B↔S | S1 energized<br>S2 de-energized |
| P2 |  | A↔S<br>B↔E | S1 de-energized<br>S2 energized |
| P3 |  | None | S1 and S2 de-energized |

| Position | Spool/body illustration | Port connectivity | Solenoid state | Pilot pressure state |
|---|---|---|---|---|
| P1 |  | A↔E<br>B↔S | S1 (NC) energized<br>S2 (NO) energized | PL1 pressurized, PL2 de-pressurized |
| P2 |  | A↔S<br>B↔E | S1 (NC) and S2 (NO) de-energized | PL1 de-pressurized, PL2 pressurized |
| P3 |  | None | S1 (NC) de-energized<br>S2 (NO) energized | PL1 de-pressurized, PL2 de-pressurized |

| Position | Spool/body illustration | Port connectivity | Solenoid state |
|---|---|---|---|
| P1 |  | A↔E<br>B↔S | S1 energized<br><br>S2 de-energized |
| P2 |  | A↔S<br>B↔E | S1 and S2<br><br>de-energized |
| P3 |  | None | S1 de-energized<br><br>S2 energized |

DIRECTIONAL CONTROL VALVE WITH DOUBLE-SOLENOID CONFIGURATIONS

CROSS REFERENCE TO RELATED APPLICATIONS

This application is a national phase application under 35 U.S.C. § 371 of International Application No. PCT/US2013/078433, filed Dec. 31, 2013, which claims priority to U.S. Provisional Patent Application Ser. No. 61/747,619, filed Dec. 31, 2012, the contents of each of which are incorporated by reference herein.

TECHNICAL FIELD

The present disclosure relates generally to directional control valves. The present disclosure relates more specifically to methods for actuating a double-solenoid three-position directional control valve using the electrical input intended for a single-solenoid two-position directional control valve.

BACKGROUND INFORMATION

A typical directional-control valve is comprised of a valve spool that slides linearly within a valve body. The valve spool is comprised of a discrete number of lobes, typically three, while the valve body is comprised of a discrete number of internal and external ports, typically five. As the valve spool slides linearly through the valve body, various ports in the valve body are covered or exposed by the lobes of the valve spool, which in effect provides various configurations of connectivity between the ports in the valve body. FIG. 1 depicts a standard valve spool and body geometry. Specifically, as depicted in FIG. 1, the valve spool of a typical directional-control valve incorporates three lobes, while the valve body of a typical directional-control valve incorporates five ports, which correspond to four distinct fluid ports, which are the supply (S), exhaust (E), and first and second actuator ports (A and B, respectively). As shown in the figure, when the valve spool is in the first position (P1), the inlet port (S) is in fluid communication with the second actuator port (B), and the exhaust port (E) is in fluid communication with the first actuator port (A). When the valve spool slides to the second position (P2), the inlet port (S) is in fluid communication with the first actuator port (A), and the exhaust port (E) is in fluid communication with the second actuator port (B). These are the two fundamental positions of a directional-control valve, and valves that provide these two positions (P1 and P2) exclusively are called two-position directional-control valves.

In a two-position valve, the valve spool is commonly (though not universally) moved within the valve body between the first and second spool positions by a single solenoid actuator. The solenoid actuation can either be configured to be a direct-acting type, in which a solenoid actuator exerts a motive force directly on the valve spool, or of the pilot-actuated type, in which the solenoid actuator controls a pilot valve, which in turn controls the flow of a pressurized fluid, which in turn exerts motive force on the valve spool. The latter is in effect a mechanism of force amplification.

In the case of a two-position valve, the valve is often actuated by a single solenoid actuator. In the direct-acting type, energizing the solenoid actuator pushes the spool directly into the first position, while de-energizing the solenoid allows a return spring (or a similar return mechanism) to push the spool back to the second spool position. In the pilot-operated type, energizing the solenoid typically opens a pilot valve, which in turn enables a supply of pressurized fluid to fill a small cylinder adjacent to the spool and push the spool into the first position. De-energizing the solenoid de-pressurizes the pilot cylinder and allows a return spring (or a similar return mechanism) to push the spool back to the second spool position. The solenoid states associated with the two positions of a typical directional control valve are shown in FIG. 1. The solenoid command corresponding to these states (for a two-position, single-solenoid valve) is illustrated in FIG. 2, where a solenoid command (S) of one corresponds to energizing the single solenoid, and a command of zero corresponds to de-energizing the solenoid.

In some embodiments of a directional-control valve, the valve includes a third position of the spool within the valve body, which is physically located in an intermediate position approximately halfway between the first and second positions of the spool relative to the valve body. The third position is characterized by a different type of fluid connectivity relative to the first and second positions. For example, in the third position, all inlet and actuator ports might be isolated (i.e., none of the four ports are in fluid communication with each other), or both actuator ports might be connected to an exhaust port. Valves that provide the two fundamental positions, in addition to a third intermediate position, are called three-position directional-control valves.

In the case of a three-position valve, the valve is actuated by a pair of opposing solenoid actuators, such that energizing one solenoid while de-energizing the other moves the spool into the first position; reversing this pattern moves the spool into the second position; and de-energizing both solenoids allows a pair of centering springs to move the spool to the third, intermediate position. A pilot-operated valve operates similarly. The solenoid states associated with these three positions are shown in FIG. 3. Note that the first and second spool positions provide the same port connectivity as the respective first and second spool positions in the two-position valve, while the third position provides a third type of port connectivity (which can have various purposes, depending on the application). Although the figure depicts the third-position connectivity as the case of isolating all ports, multiple possibilities exist for third-position port connectivity, and thus the third-position connectivity shown in the figure is merely for illustrative purposes. The solenoid commands corresponding to the three spool positions of the double-solenoid valve are illustrated in FIG. 4, where the two solenoid commands, S1 and S2, correspond to the first and second solenoid, respectively. A command value of one corresponds to energizing the respective solenoid, while a command value of zero corresponds to de-energizing the respective solenoid.

SUMMARY

Exemplary embodiments of the present disclosure comprise a double-solenoid, three-position directional control valve that can operate from the electrical command intended to operate a single-solenoid, two-position valve, for specialized applications in which the third spool position is desired momentarily, when the spool is moved between the first and second spool positions.

Specifically, in some applications, one may wish to replace a two-position directional-control valve with a three-position directional-control valve. Further, in some applications, one may also desire to use the three-position valve in a manner such that the valve spool remains in the third position only momentarily, when moving between the first and the second spool positions. For the special case of such applications, it is further desirable to replace the (single-solenoid) two-position valve with the (double-solenoid) three-position valve without altering the original electrical command intended for the single-solenoid valve. Replacing a single-solenoid valve with a double-solenoid valve, however, creates a mismatch between the electrical power requirements needed to achieve the first and second spool position in each respective valve. In particular, as shown in FIG. 2, the single-solenoid, two-position valve maintains spool position P2 in the absence of an electrical input energizing the solenoid; conversely, as shown in FIG. 4, the double-solenoid, three-position valve requires an energized solenoid to maintain spool position P2. In the absence of a source of solenoid energy, the three-position valve will remain in spool position P3.

For the previously described standard configurations illustrated in FIGS. 1-2 and 3-4, respectively, the solenoid commands corresponding to a cyclic movement from the second spool position (P2) to the first spool position (P1), and back to the second position (P2) for the respective valves are shown in FIG. 5A. Specifically, the top plot in the figure shows the normalized solenoid voltage (S) as a function of time for a single-solenoid, two-position directional control valve, where the spool is commanded to move from P2 to P1 at $t=T_1$, and commanded to move from P1 to P2 at at $t=T_2$. The bottom two plots in the figure show the normalized solenoid voltages (S1 and S2) for the first and second solenoids, respectively, required to provide the same movement between P1 and P2, with the additional energy-saving functionality. The shaded portion of the bottom figure (S2) indicates a fundamental problem with the use of the standard three-position configuration for purposes of obtaining equivalent functionality with the double-solenoid valve using the single-solenoid valve command. In order to maintain the double-solenoid three-position valve spool in the second position (P2), the second solenoid must be energized (as per FIGS. 3 and 4); however, in this case, the electrical solenoid command to the single-solenoid valve is zero (i.e., the single solenoid of the valve is normally de-energized to maintain the second spool position), and thus no electrical power is present from the single-solenoid command to energize S2 in the three-position valve. As such, a fundamental discrepancy exists between the electrical power requirements to maintain the second spool position in a single-solenoid and double-solenoid type directional control valves. Exemplary embodiments of the present disclosure comprise alternate configurations of a three-position double-solenoid directional control valve that circumvents this issue (requiring sustained electrical energy when none is present), and thus enables a double-solenoid three-position valve to function with the electrical command corresponding to a typical single-solenoid two-position valve.

Particular embodiments include a double-solenoid directional control valve comprising: a valve body; a first solenoid actuator; a second solenoid actuator; and a valve spool within the valve body. In certain embodiments, the valve spool is configured to move within the valve body between a first position, a second position and a third position, where the third spool position lies between the first and second spool positions, and where the spool is maintained in the first and third positions by energizing at least the first or the second solenoid actuator, and where the spool is maintained in the second position by de-energizing both the first and the second solenoid actuators.

In certain embodiments, the first and second solenoid actuators are configured as pilot-operated type solenoid actuators. In specific embodiments, one of the first or second solenoid controls a normally-closed pilot valve and the other solenoid controls a normally-open pilot valve. Particular embodiments further comprise a set of centering springs configured to maintain the spool in the third position in the absence of pressurization from the normally-closed pilot valve or the normally-open pilot valve. In certain embodiments, energizing both the first and second solenoids pressurizes the first pilot and maintains the valve spool in the first position. In specific embodiments, de-energizing both the first and second solenoids pressurizes the second pilot and maintains the valve spool in the second position.

In particular embodiments, de-energizing the first solenoid and energizing the second solenoid de-pressurizes both pilots, and allows the centering springs to maintain the valve spool in the third position.

In certain embodiments, the valve is operated by a single electrical input, which is high (energized) when the spool is commanded to the first position, and low (de-energized) when the spool is commanded to the second position. In particular embodiments, a high electrical input energizes both the first and second solenoids and maintains the spool in the first position. In specific embodiments, electrical energy from the single electrical input is stored in the valve when the spool is in the first position.

In certain embodiments, at least one of a capacitor, a supercapacitor, or a battery is used to store electrical energy. In specific embodiments, upon a transition of the single electrical input from high to low, stored electrical energy supplies power to temporarily energize at least one of the solenoid actuators. In particular embodiments, upon a transition of the single electrical input from high to low, the stored electrical energy is used to energize the second solenoid actuator for a prescribed interval of time, which maintains the spool in the third position. In certain embodiments, upon a transition of the single electrical input from low to high, only the second solenoid is initially energized for a prescribed period of time, which maintains the spool in the third position. In specific embodiments, upon a transition of the single electrical input from low to high, the first solenoid is energized only after the second solenoid has been energized for a prescribed interval of time.

In particular embodiments, the solenoid actuation is of the direct-acting type. In certain embodiments, in the absence of solenoid actuation, at least one spring maintains the spool in the second position. In certain embodiments, energizing at least one solenoid maintains the spool in the first position. In specific embodiments, energizing at least one solenoid maintains the spool in the third position. In particular embodiments, the valve is operated by a single electrical input, which is either high (energized) or low (de-energized).

In certain embodiments, electrical energy from the single electrical input is stored when the input is high. In particular embodiments, at least one of a capacitor, supercapacitor, or battery is used to store electrical energy. In specific embodiments, upon a transition of the single electrical input from high to low, the stored electrical energy supplies power to energize at least one solenoid for a prescribed interval of time. In certain embodiments, upon a transition of the single electrical input from low to high, only one solenoid is initially energized for a prescribed interval of time. In particular embodiments, upon a transition of the single electrical input from low to high, the de-energized solenoid is energized after the energized solenoid has been energized for a prescribed interval of time.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION OF EXEMPLARY EMBODIMENTS

Pilot-Operated Example

Figure 1:
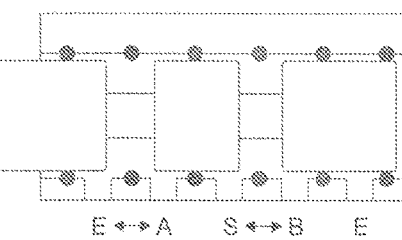
FIG. 1 depicts typical single-solenoid, two-position four-way directional control valve states.
Figure 2:
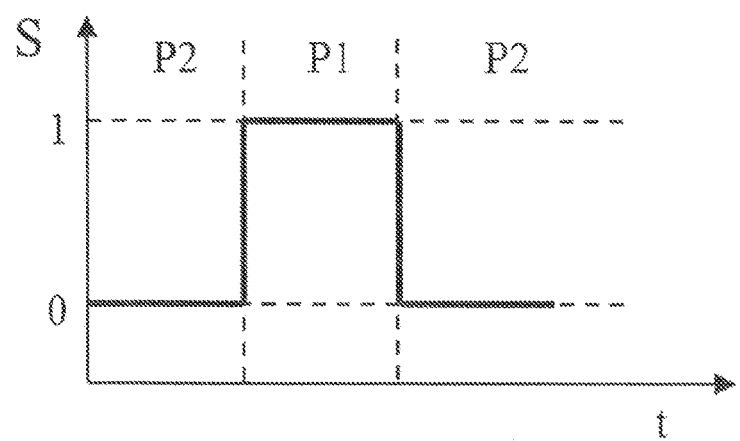
FIG. 2 depicts solenoid command (versus time) corresponding to first and second spool positions in a single-solenoid two-position directional control valve. A solenoid command of one corresponds to energizing the solenoid, while a command of zero corresponds to de-energizing the solenoid.
Figure 3:
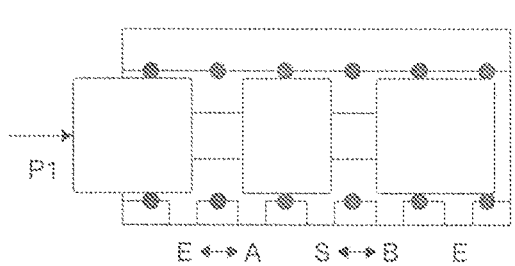
FIG. 3 depicts three spool positions and corresponding solenoid commands corresponding to typical three-position directional control valve with typical (either pilot-operated or direct-acting) double-solenoid actuation.
Figure 3:
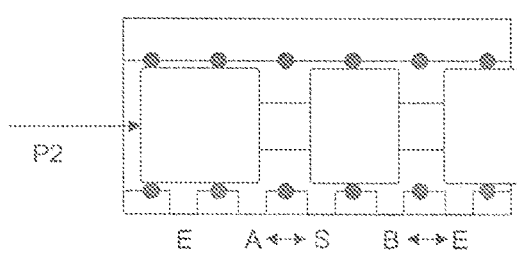
Figure 3:
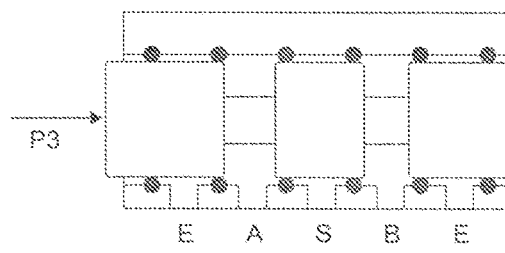
Figure 4:
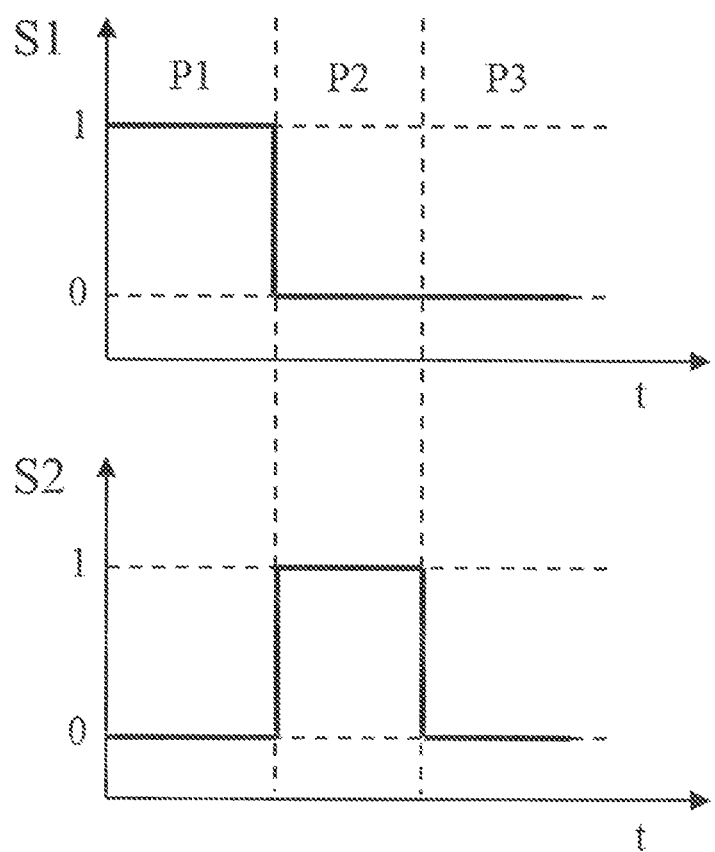
FIG. 4 depict solenoid commands (versus time) corresponding to first and second solenoids, corresponding to first, second, and third spool positions in a typical double-solenoid three-position directional control valve

The lack of electrical power required to operate the three-position energy-saving valve can be circumvented by employing alternate actuation configurations for the three-position valve. Specifically, in a standard three-position double-solenoid valve (e.g., FIG. 3), de-energizing both solenoids allows a set of centering biasing members (e.g., springs) to maintain the spool into the third (centered) spool position. This application proposes alternate actuation configurations for a three-position double-solenoid valve in which de-energizing both solenoids instead maintains the spool in the second (non-centered) spool position.

Consider first the case of a pilot-operated double-solenoid valve. In such a valve, rather than move the spool directly, the solenoid actuators control fluid connectivity to a pilot fluid supply, which in turn moves the spool by pressurizing the first or second end of the spool. In a conventional solenoid-actuated pilot-operated valve, energizing only the first solenoid opens a first normally-closed pilot valve, which in turn uses the pressurized gas in the pilot to push the spool into the first position. Similarly, energizing only the second solenoid opens a second normally-closed pilot valve, which in turn uses the pressurized gas in the pilot to push the spool (back) into the second position. De-energizing both solenoids closes both pilot valves (i.e., depressurizes both sides of the spool), and allows the centering springs to move the spool into the third (centered) position.

Figure 5A:
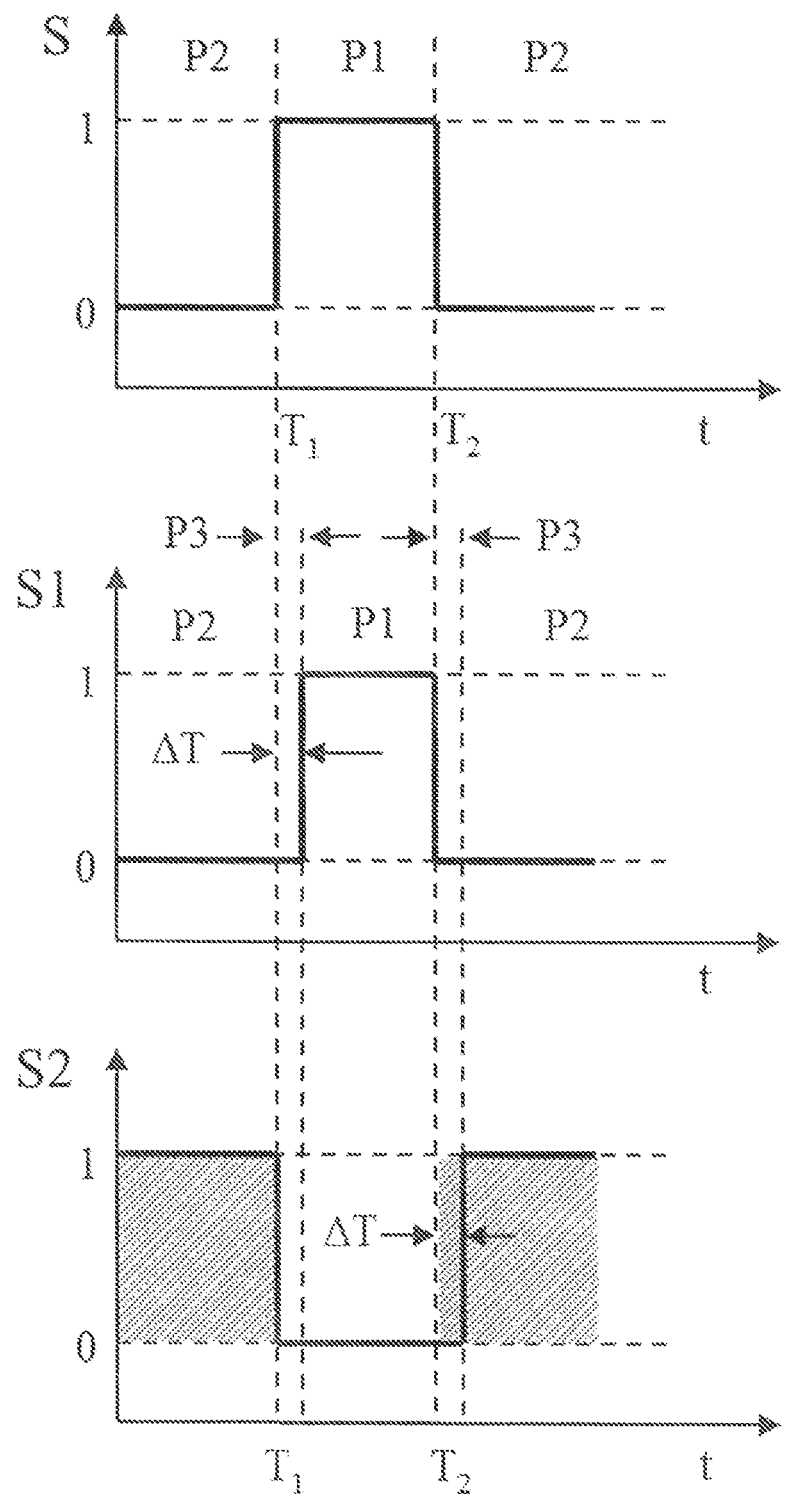
FIG. 5A depicts solenoid command corresponding to single-solenoid two-position valve (S), and corresponding solenoid commands (S1 and S2) required for same cycle of actuator reversal for energy-saving valve with a conventional double-solenoid configuration. The shaded areas correspond to regions in which the double-solenoid configuration requires electrical energy (i.e., requires that one of the solenoids be energized), but no electrical energy is directly available from the single-solenoid command.
Figure 5B:
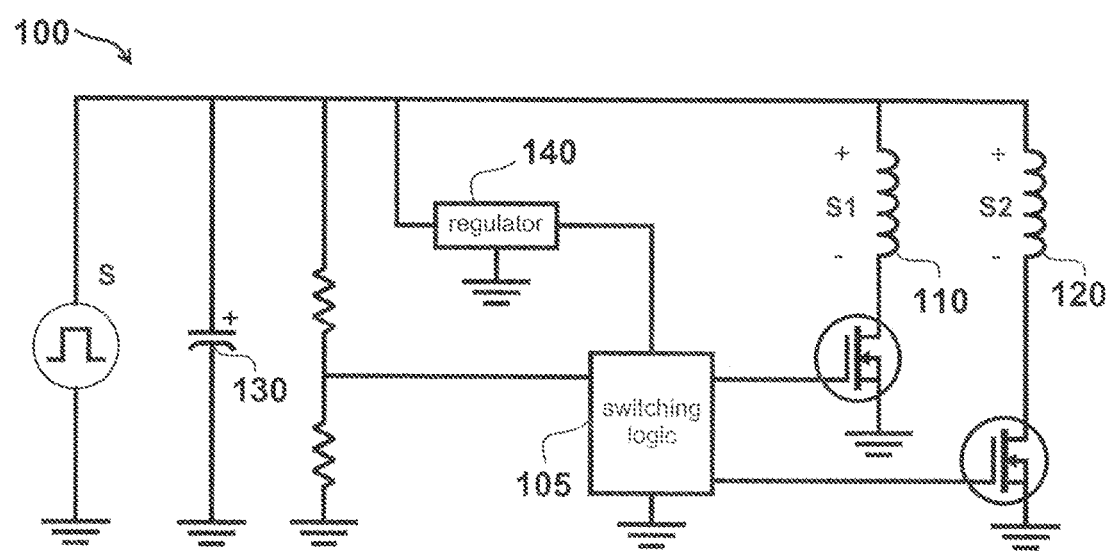
FIG. 5B depicts an electrical schematic of a circuit that may be used in exemplary embodiments to control a single-solenoid two position valve.

Rather than use both solenoids to control normally-closed pilot valves (as in the conventional case), the pilot-operated embodiment described here employs one solenoid that controls a normally-closed pilot, and one solenoid that controls a normally-open pilot. For example, the three-position valve described here can be configured such that the first solenoid (S1) controls a normally-closed pilot valve, while the second solenoid (S2) controls a normal-open pilot valve. An electrical schematic of a circuit 100 that may be used in exemplary embodiments to control a single-solenoid two position valve is shown in FIG. 5B. In FIG. 5B, the labels S, S1, and S2 correspond to the same (voltage levels) shown in FIGS. 5, 7, 9 and 11. In the embodiment shown, circuit 100 comprises a switching logic block 105. FIGS. 5-11 describe different strategies for the switching logic block 105.

As shown in FIG. 5B, circuit 100 also comprises a first solenoid actuator 110, a second solenoid actuator 120, a capacitor 130. In certain embodiments, capacitor 130 may be configured as a capacitor, supercapacitor or battery. In the embodiment shown, circuit 100 further comprises a regulator 140 and a voltage divider 150. In certain embodiments, regulator 140 and voltage divider 150 can be used to provide different voltage levels to different components in the circuit. For example, in certain embodiments, the solenoid command voltage is 24 volts, while the logic circuitry voltage is 5 volts or 3.3 volts.

In specific embodiments, the circuit logic can be implemented in a microcontroller, including for example, a small 8-bit microcontroller to implement the switching logic.

In this case, energizing both solenoids will open the first pilot and close the second, thus maintaining the spool in the first position; de-energizing both solenoids will shut off the first pilot and open the second, thus maintaining the spool in the second position; and de-energizing the first solenoid and energizing the second will shut off both pilot supplies and allow the centering springs to maintain the spool in the third position. This configuration is outlined in FIG. 6. Assuming this configuration, the solenoid valve commands for the first and second solenoids (S1 and S2) corresponding to a cycle of actuator reversal are shown in FIG. 7, relative to the corresponding single solenoid valve command (S) for the same actuator reversal.

Figure 6:
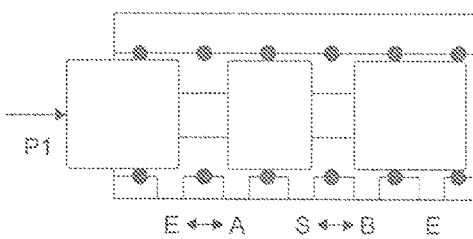
FIG. 6 depicts three positions of a pilot-operated energy-saving directional control valve with an alternate double-solenoid configuration, where S1 controls a normally-closed (NC) pilot valve and S2 controls a normally-open (NO) pilot valve. The symbols PL1 and PL2 correspond to the first and second valve pilots, respectively.
Figure 6:
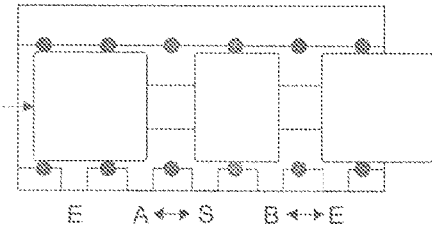
Figure 6:
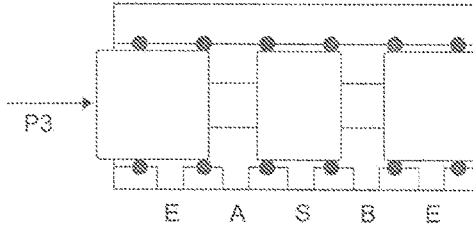
Figure 7:
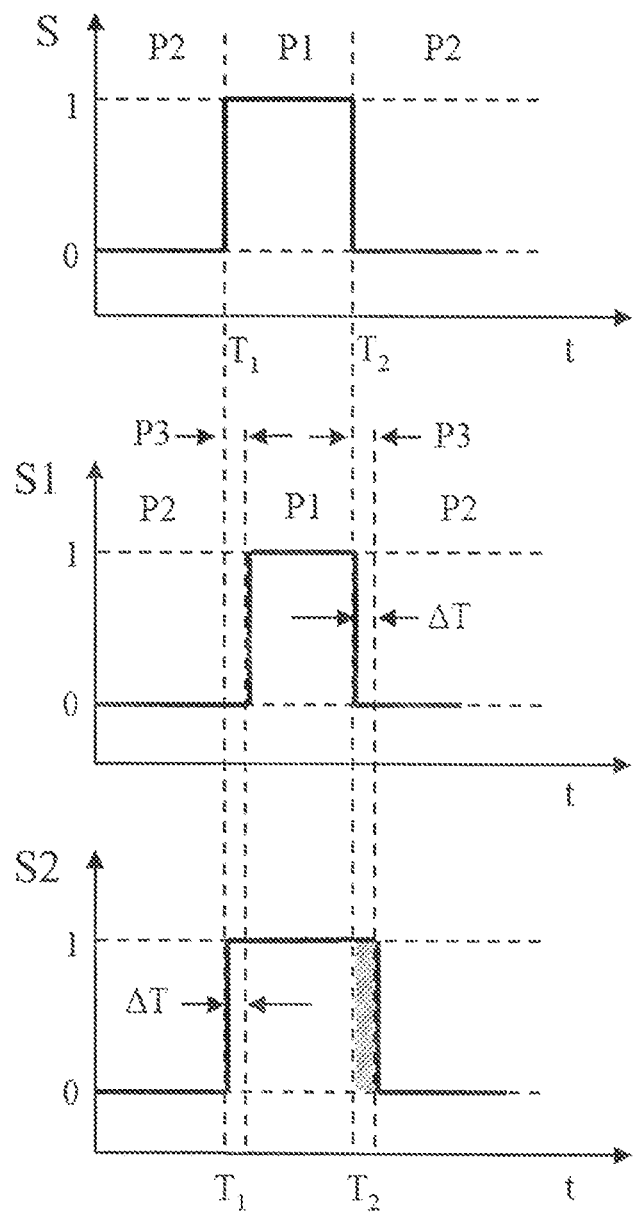
FIG. 7 depicts solenoid commands corresponding to actuator reversal for a single-solenoid two-position valve (S), and corresponding required solenoid commands (S1 and S2) for actuator reversal for energy saving valve with alternate double-solenoid configuration. The shaded portion indicates the region of operation in which the solenoid S2 must be energized in the absence of direct electrical power from the standard single-solenoid valve command.

In contrast with the continuous unmet energy requirement to maintain P2 (indicated in FIG. 5A), the configuration of FIG. 6 and FIG. 7 requires only a small, finite amount of actuation energy over a short period of time that is not directly supplied by the electrical source, corresponding to the period of dwell when the spool transits from the first to the second spool positions. Specifically, the shaded portion of FIG. 7 indicates the region of operation in which the solenoid S2 must be energized in the absence of direct electrical power from the standard single-solenoid electrical command. Since the dwell time ($\Delta T$) is short (on the order of tens to hundreds of milliseconds), the total energy required per cycle in this configuration is small, and can be provided by an energy storage methodology, such as a standard electrical capacitor, supercapacitor, or small rechargeable battery.

Specifically, since this temporary energy is required in the transition from the first to the second position, and since the first position is associated with direct electrical power supplied by the standard single-solenoid command, energy supplied during this state can be stored electrically and used to energize the second solenoid for the brief period of dwell immediately following the directly energized state. Thus, this alternate configuration double-solenoid valve enables a method of operating the special case of a three-position valve described here (i.e., that dwells for a short period of time in the third position when moving between the first and second spool positions) that maintains electrical compatibility with a two-position single-solenoid valve command.

Direct-Acting Example

Consider now the case of a double-solenoid valve that moves the spool via direct solenoid actuation (i.e., without pilot operation). In a conventional direct-acting solenoid-actuated valve, energizing only the first solenoid pulls the core of the solenoid into a coil, which directly pushes the spool into the first position. Similarly, energizing only the second solenoid directly pushes the spool (back) into the second position. De-energizing both solenoids allows a set of centering springs to move the spool into the third (centered) position. In this configuration, the relationship of solenoid actuation and spool position is identical to the conventional pilot-operated case (illustrated in FIG. 6), and as such the electrical requirements relative to the command for a two-position single-solenoid valve are the same as well, as illustrated by FIG. 5A (i.e., a continuous unmet electrical energy requirement in order to maintain the spool in the second position). In order to make the double-solenoid valve compatible with the command for a single-solenoid valve, two alternate solenoid configurations are described here. Both are characterized by a spool return mechanism (e.g., return springs) that maintains the spool in the second position when both solenoid actuators are de-energized. That is, unlike the conventional three-position configuration, maintaining the spool in the third (centered) spool position requires that at least one solenoid actuator is energized.

Figure 8:
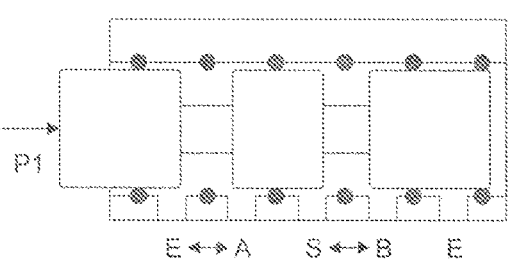
FIG. 8 depicts a first embodiment of alternate double-solenoid three-position valve configuration.
Figure 8:
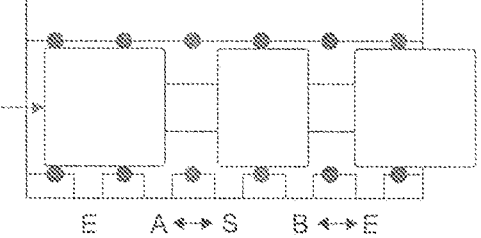
Figure 8:
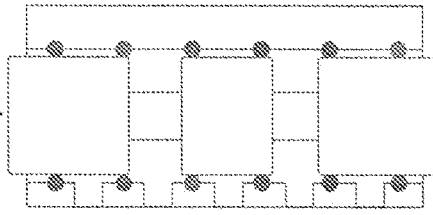
Figure 9:
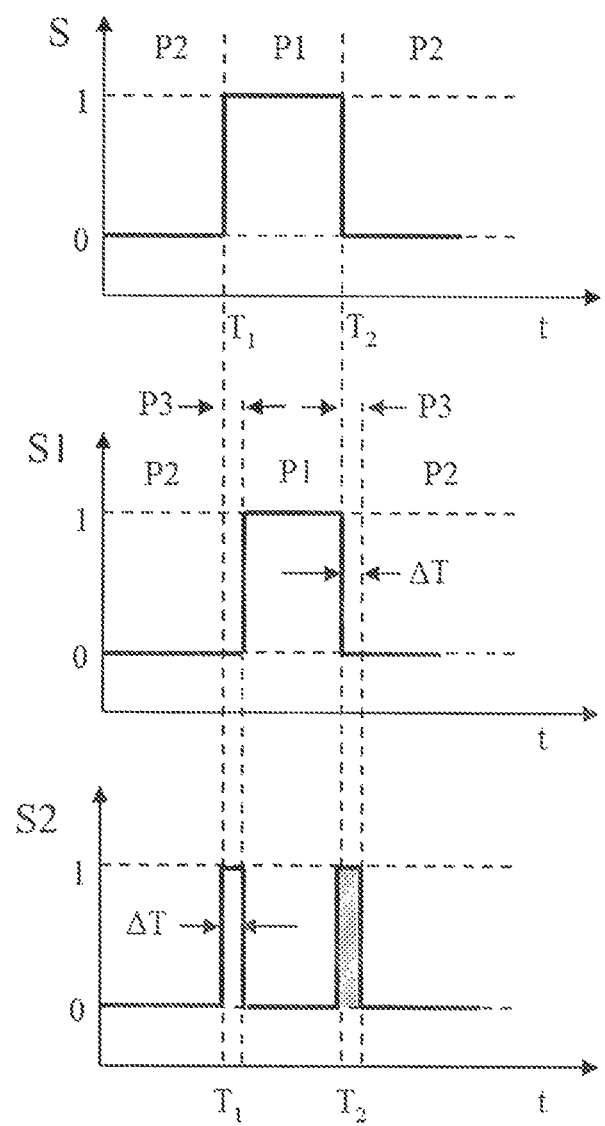
FIG. 9 depicts solenoid commands corresponding to actuator reversal in single-solenoid two-position valve (S), and corresponding required solenoid commands (S1 and S2) required for actuator reversal in first embodiment of an alternate double-solenoid configuration of three-position valve. The shaded portion indicates the region of operation in which the solenoid S2 must be energized in the absence of direct electrical power from the standard single-solenoid command.

One such configuration of solenoid actuation for the three-position valve is illustrated in FIG. 8. In this first embodiment, the first position is maintained by energizing only the S1 solenoid against a return spring; the second position is maintained by de-energizing both the S1 and S2 solenoids, allowing the return mechanism (e.g., springs) to maintain the spool in the second position; and the third position is maintained by energizing only the S2 solenoid against the return spring. The solenoid commands required in this configuration, relative to a two-position standard command, are shown in FIG. 9, where the shaded portion of this figure indicates the region of operation in which the solenoid S2 must be energized in the absence of direct electrical power from the standard single-solenoid valve command.

Figure 10:
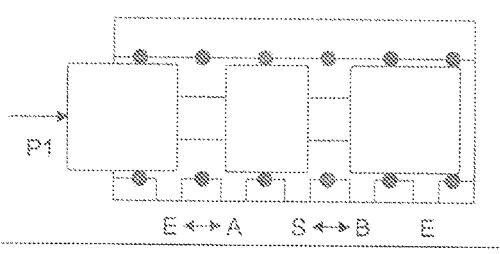
FIG. 10 depicts a second embodiment of alternate double-solenoid three-position valve configuration.
Figure 11:
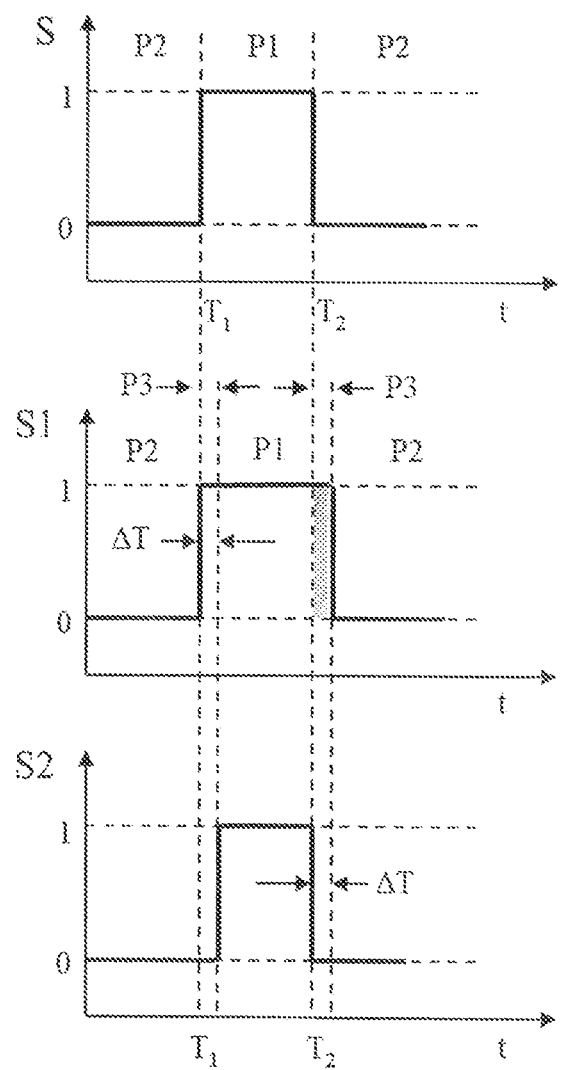
FIG. 11 depicts solenoid commands corresponding to actuator reversal in single-solenoid two-position valve (S), and corresponding required solenoid commands (S1 and S2) required for actuator reversal in second embodiment of an alternate double-solenoid configuration of three-position valve. The shaded portion indicates the region of operation in which the solenoid S1 must be energized in the absence of direct electrical power from the standard single-solenoid valve command.

In a second alternate embodiment, illustrated in FIG. 10, the first position is maintained by energizing both the S1 and S2 solenoids against a return spring; the second position is maintained by de-energizing both the S1 and S2 solenoids, allowing the return spring (or springs) to maintain the spool position; and the third position is maintained by energizing only the S1 solenoid against the return spring (or springs) to maintain the third position. The solenoid commands required in this configuration, relative to a two-position standard command, are shown in FIG. 11. The shaded portion of the figure indicates the region of operation in which the solenoid S1 must be energized in the absence of direct electrical power from the standard single-solenoid valve command.

The invention claimed is:

1. A double-solenoid directional control valve comprising:
   a valve body;
   a first solenoid actuator;
   a second solenoid actuator; and
   a valve spool within the valve body, wherein:
   the valve spool is configured to move within the valve body between a first position, a second position and a third position, where the third spool position lies between the first and second spool positions, and where the spool is maintained in the first and third positions by energizing at least the first or the second solenoid actuator, and where the spool is maintained in the second position by de-energizing both the first and the second solenoid actuators;
   the first and second solenoid actuators are configured as pilot-operated type solenoid actuators; and
   one of the first or second solenoid controls a normally-closed pilot valve and the other solenoid controls a normally-open pilot valve.

2. The valve of claim 1, further comprising a set of centering springs configured to maintain the spool in the third position in the absence of pressurization from the normally-closed pilot valve or the normally-open pilot valve.

3. The valve of claim 2, where energizing both the first and second solenoids pressurizes the first pilot and maintains the valve spool in the first position.

4. The valve of claim 2, where de-energizing both the first and second solenoids pressurizes the second pilot and maintains the valve spool in the second position.

5. The valve of claim 2, where de-energizing the first solenoid and energizing the second solenoid de-pressurizes both pilots, and allows the centering springs to maintain the valve spool in the third position.

6. The valve of claim 5, wherein the valve is operated by a single electrical input, which is high (energized) when the spool is commanded to the first position, and low (de-energized) when the spool is commanded to the second position.

7. The valve of claim 6, wherein a high electrical input energizes both the first and second solenoids and maintains the spool in the first position.

8. The valve of claim 6, where electrical energy from the single electrical input is stored in the valve when the spool is in the first position.

9. The valve of claim 8, where at least one of a capacitor, a supercapacitor, or a battery is used to store electrical energy.

10. The valve of claim 8, where upon a transition of the single electrical input from high to low, stored electrical energy supplies power to temporarily energize at least one of the solenoid actuators.

11. The valve of claim 10, where upon a transition of the single electrical input from high to low, the stored electrical energy is used to energize the second solenoid actuator for a prescribed interval of time, which maintains the spool in the third position.

12. The valve of claim 6, where upon a transition of the single electrical input from low to high, only the second solenoid is initially energized for a prescribed period of time, which maintains the spool in the third position.

13. The valve of claim 6, where upon a transition of the single electrical input from low to high, the first solenoid is energized only after the second solenoid has been energized for a prescribed interval of time.

\* \* \* \* \*